Figure 1:
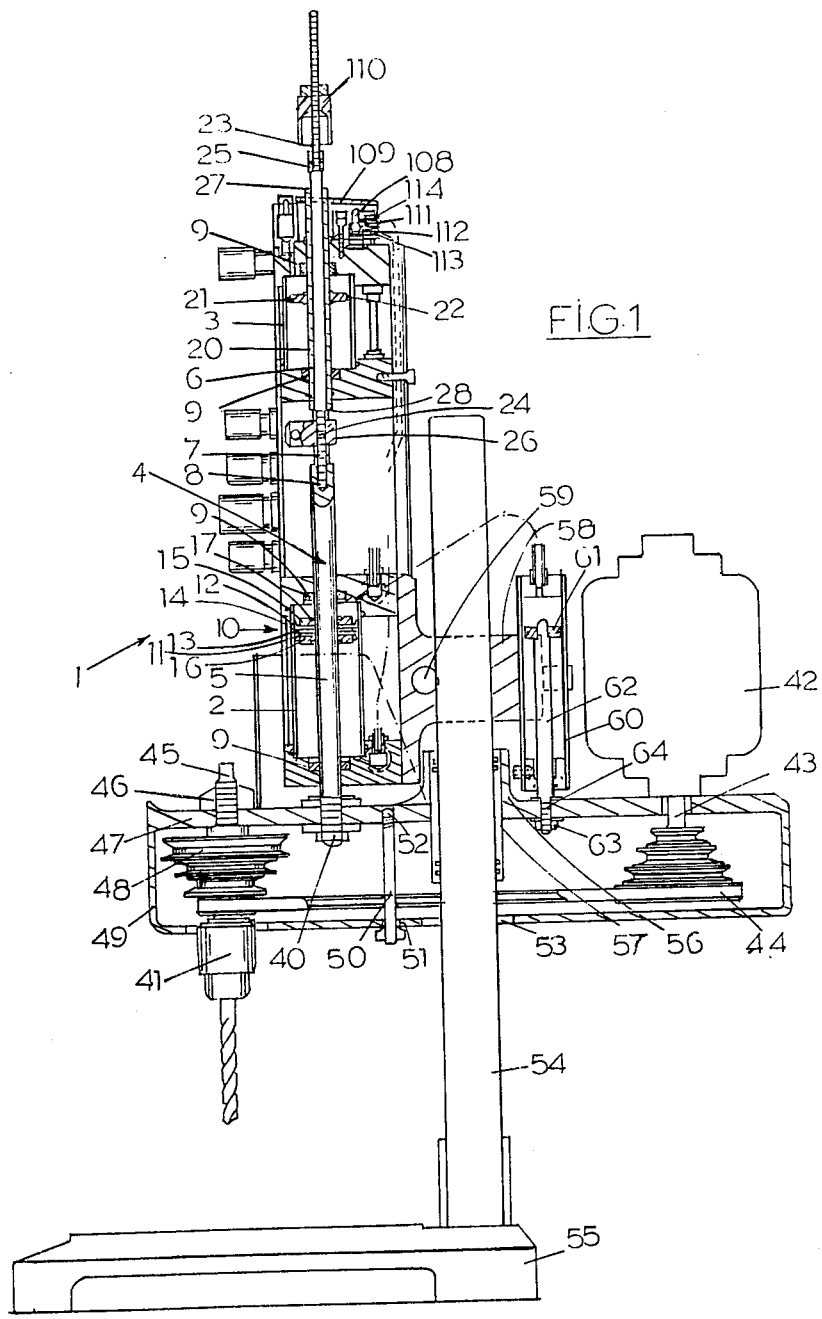

United States Patent [19]

Sorensen

[11] 4,102,593
[45] Jul. 25, 1978

[54] FLUID PRESSURE DRILL FEEDING DEVICE

[75] Inventor: Keld Torben Schneider Sorensen, Auckland, New Zealand

[73] Assignee: K. & V. Sorensen Engineering Ltd., Auckland, New Zealand

[21] Appl. No.: 661,929

[22] Filed: Feb. 27, 1976

[30] Foreign Application Priority Data

Mar. 5, 1975 [NZ] New Zealand .................. 176840

[51] Int. Cl.² ........................ B23B 39/10; B23B 47/16
[52] U.S. Cl. ........................................ 408/130; 92/10; 408/234
[58] Field of Search ............ 408/128, 130, 124, 129, 408/234, 17; 92/8, 10

[56] References Cited

U.S. PATENT DOCUMENTS

| 2,189,152 | 2/1940 | Procunier | 408/130 X |
| 2,669,136 | 2/1954 | Dodson | 408/234 |
| 2,692,660 | 10/1954 | Good et al. | 408/130 |
| 2,876,664 | 3/1959 | Gurney | 408/130 X |
| 2,977,826 | 4/1961 | Radford | 408/17 X |
| 3,362,266 | 1/1968 | Krafft | 408/130 X |

*Primary Examiner*—Othell M. Simpson
*Assistant Examiner*—Z. R. Bilinsky
*Attorney, Agent, or Firm*—Ladas, Parry, Von Gehr, Goldsmith & Deschamps

[57] ABSTRACT

A drill is provided on which the chuck and motor are mounted on a support which moves vertically. Thus the motor rises and falls with the movement of the drill. Also the vertical movement of the drill chuck is controlled by an air cylinder which has mounted axially above it an hydraulic checking cylinder arranged so that checking occurs after an initial unchecked downward movement of the chuck. Automatic and manual operation are controlled by a five port valve in which a piston changing the air direction flow is moved by air blasts directed to each end of the channel in which the piston moves.

10 Claims, 4 Drawing Figures

FLUID PRESSURE DRILL FEEDING DEVICE

This invention relates to operating means and has been devised particularly though not solely for use in operating a drill.

Drills at present available have the disadvantage that they are generally, particularly when of a relatively small size, hand-operated and this means that where a large number of consecutive performances of a similar drilling operation are to be performed, much effort is expended in operating the drill. Attempts to provide automatic control for drills have resulted in drills which are complex and therefore expensive. Furthermore such drills have a high energy consumption rate. Thus when compressed air, for example, is used to drive the drill large volumes of air must be provided. This and also inherent clumsiness of the machines to operate make such machines disadvantageous.

It is therefore an object of the present invention to provide a drill which will obviate or minimise the foregoing disadvantages in a simple yet effective manner or which will at least provide the public with a useful choice.

Accordingly the invention consists in a drill including a drill shaft mounting a drill chuck, a support member rotatably mounted on said drill shaft in a manner such that movement of said support member in a direction substantially parallel to the longitudinal axis of said support member is substantially prevented, said support member carrying a motor and drive means being provided between said motor and said shaft.

To those skilled in the art to which this invention relates, many changes in construction and widely differing embodiments and applications for the invention will suggest themselves without departing from the scope of the invention as defined in the appended claims. The disclosures and the description herein are purely illustrative and are not intended to be in any sense limiting.

Figure 2:
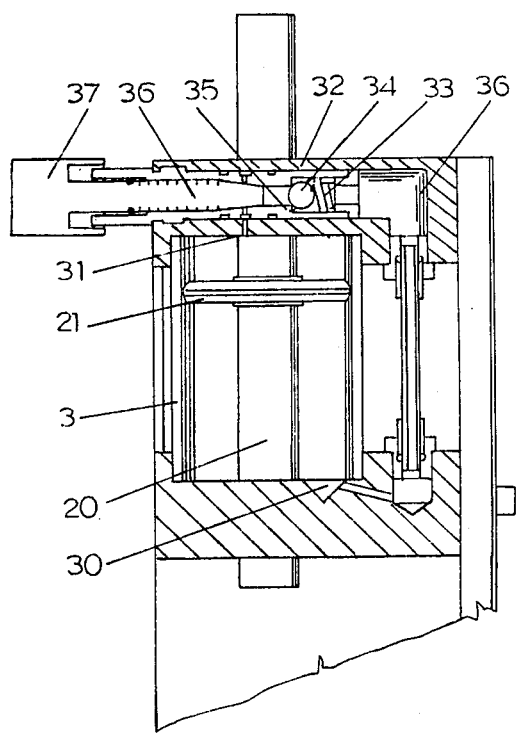
Figure 3:
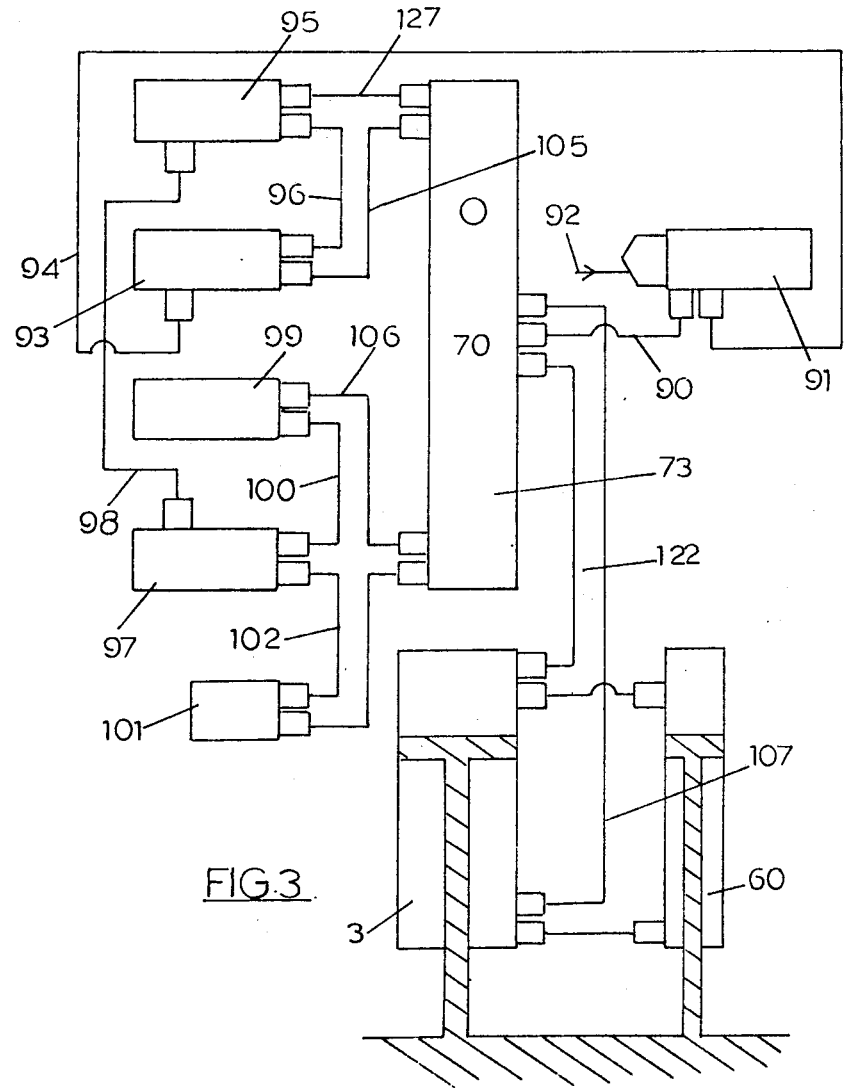
Figure 4:
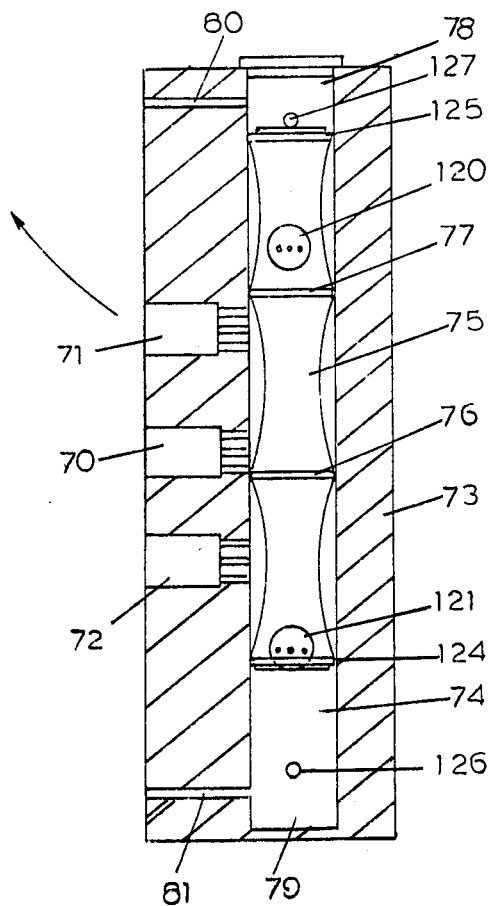

One preferred form of the invention will now be described with reference to the accompanying drawings in which:

FIG. 1 is a diagrammatic side elevation partly in cross section of a drill according to the invention, FIG. 2 is a diagrammatic side elevation of a part of a drill according to the invention, FIG. 3 is a diagrammatic lay out of a control member for controlling the operation of the drill according to the invention, and FIG. 4 is a diagrammatic cross sectional elevation of a valve arrangement for a drill according to the invention.

In the preferred form of the invention a drill 1 is provided but aspects of the invention such as the control means and the operating means are of course applicable to other mechanically operated devices.

Control means are provided for the drill and the control means include an air cylinder 2 and a hydraulic cylinder 3, the hydraulic cylinder 3 preferably being mounted axially in line with the air cylinder 2.

A rod 4 passes through both cylinders and the rod 4 may comprise a lower part 5 passing through the cylinder 2 and an upper part 6 passing through the hydraulic cylinder 3, the parts being formed separately and joined by a male screw threaded part 7 on the upper rod 6 engaging a female screw threaded part 8 on the lower rod.

Suitable seals 9 are provided at the entry and exit points from each cylinder.

An air cylinder piston 10 is fixed to the rod 4 within the cylinder 2 and the piston may comprise a pair of spaced apart plates 11 and 12 separated by a spacer 13 with a sealing gasket or ring 14 fixed therein.

The plates 11 and 12 may be held by locating annular members 15 and 16 fixed to the shaft 4 for example by pins or by circlips such as at 17.

Thus a movement of the piston 10 will cause a corresponding movement of the rod 4.

A hollow member such as tube 20 is provided about the rod 4 where the rod 4 passes through the upper or hydraulic cylinder 3 and again suitable seals are provided where the rod passes through the walls of the cylinder 3. A hydraulic piston 21 is fitted to the tube 20 and suitable seals positioned as at 22 such as an O-ring.

Engagement means are provided so that when movement of the air piston 10 causes a corresponding movement of the rod 4 the engagement means will cause a movement of the tube 20 and preferably the engagement means are arranged such that the rod 4 may move predetermined distances before causing a movement of the tube 20 to be made.

In order to achieve this a threaded portion 23 at the upper end of the rod is provided and a nut 25 is provided on the threaded portion 23.

The diameter of the nut 25 is such that the upper end 27 of the tube 20 will engage the nut when the tube 20 moves a sufficient distance.

The distance of the down stroke is controlled by movement of nut 110.

A collar 26 is also provided on threaded part 24 of the rod 4 the use of which will be described later herein.

When reverse movement of the rod occurs, downward movement of the rod 4 will take place until the nut 25 engages the surface 27 of the tube 20 before downward movement of the piston 21 again occurs within the cylinder 3.

By adjusting the position of the nut 25 and the collar 26 the range of movement through which the rod 4 will pass before engagement of the nut and collar with the rod 20 can be varied.

Hydraulic cylinder 3 provides damping and this may be achieved by providing apertures through the wall of the cylinder. Thus referring to FIG. 2 a fluid arrangement is shown there being one fluid path shown between the ends of the cylinder. In the machine itself two such paths are provided. Referring to the paths shown a fluid inlet 30 is provided and a fluid outlet 31 is also provided.

Thus as the piston 21 rises fluid will be forced through outlet 31 and passed through a chamber 32.

A non return valve is then provided which may comprise for example a spring 33 mounting a ball 34 which rests against a shoulder such as shoulder 35.

The passageway continues as at 36 to eventually link with the inlet 30.

Thus as the piston 21 rises fluid will pass to the chamber 32 forcing the ball 34 from the seat 35 and allowing the fluid to pass to the inlet 30 thus placing the fluid in the opposite end of the hydraulic cylinder.

The flow rate through the channels between the ends of the cylinder may be controlled by providing that the outlet 31 passes to a tapered chamber into which a tapered screw 36 is provided such that by rotating the handle 37 a screw may move inwardly or outwardly thus varying the effective aperture size in the tapered passageway. O-rings or other seals are provided as necessary between moving surfaces.

The other (non-illustrated) passageway has the non return valve reversed in direction so that the flow rate of the fluid in the passageways in each direction may be independently controlled. This provides speed control for the drill in each direction.

The drill shaft 4 is engaged at the lower end 40 with a chuck 41 and although this engagement may be in a conventional manner, it is preferred that this engagement is effected as follows.

The drill shaft is engaged with a support member such as a platform but preferably comprising a hollow chamber.

On to the support platform or chamber is mounted a motor 42 which is preferably an electrically operated motor.

The drive shaft 43 with the motor may have a pulley or series of pulleys. In FIG. 1 a four step pulley is shown but other multiples of steps can be used.

A belt 44 passes about the pulleys and also the belt passes about a further series of pulleys mounted on the chuck 41.

Thus the chuck 41 may pass through the lower surface of the chamber being fixed to the chamber by means of a threaded rod 45 passing into a nut 46 held on the upper surface 47 of the chamber. The rod 45 passes into a bearing (not shown) which bearing mounts the pulley and thus the chuck 41.

The chuck 41 is rigidly mounted on the pulley 48.

The hollow member may be comprised of a upper part 47 and a lower part 49 joined together by screws or bolts such as bolt 50 passing through an aperture 51 in the lower cover 49 and being engaged with a threaded aperture 52 in the upper surface 47 of the chamber.

The hollow member on the lower surface thereof has an aperture 53 provided therein through which a support shaft 54 arising from a drill stand 55 may pass and a collar 56 is preferably provided on the upper surface of the chamber, the support shaft 54 passing through the collar 56 and there being for example a brass bush or other bearings 57 positioned between the shaft and the collar.

The cylinder arrangement or operating means of the drill is affixed to the shaft 54 for example by a clip or clamp at 58 passing around the shaft 54 which may be tightened by a screw or bolt indicated at 59.

Thus when the rod 4 is raised or lowered the hollow member mounting the chuck 41 will be moved upwardly or downwardly by the shaft 4.

In order to balance the forces applied to the hollow member during shifting or lowering thereof an auxiliary cylinder 60 may be provided having a piston 61 therein affixed to a shaft 62 the shaft 62 being engaged with the upper part 47 of the hollow member for example by a nut 63 on a screw threaded part 64 of the upper surface 47.

The arrangement there is therefore such that movement of the hollow member in a direction substantially parallel to the longitudinal axis of the drill shaft is substantially prevented and thus as the drill shaft is raised or lowered, the motor 42 will also be raised or lowered.

The control means for the motor controls (not shown) may also be and preferably are mounted on the hollow member.

Of course the pulley arrangement shown may be replaced by cogs or chains or any other suitable constructions.

Valve means may be provided to control the air flow in the drill although of course it is envisaged that such valves may have other similar operations and uses.

The valve includes a body having an inlet port 70 thereto and a pair of outlet ports 71 and 72 therefrom.

The valve body 73 has a float channel 74 therein and a float 75 is positioned within the channel.

The float may take the form of a piston having O-rings 76 and 77 thereon. The O-rings are positioned such that when the float 75 is at one end of the float channel one O-ring, i.e., O-ring 76 will close the path to outlet 72 and with the float at the other end of the float channel 74 the O-ring 77 will close the path to the other outlet 71. Exhaust parts 120 and 121 are provided and O-rings 76 and 77 also close the path to one of the exhaust ports 120 or 121.

To enable the O-rings to slide over ports 71, 72, 73, 120 and 121 these are made by providing a plurality of small apertures in to the float chamber as shown in FIG. 4.

In order to control the movement of the float control means are provided to move the float in the float channel and the control means are operable to supply liquid or gas for example air from the air inlet 70 to the end 78 and 79 of the float channel.

Thus the float is in the form of a rod having circumferential grooves thereabout there being four such circumferential grooves and each groove may have an O-ring therein. O-rings 76 and 77 are positioned as above described and O-rings 124 and 125 provide seals to form chambers at ends 78 and 79 of the float chamber 74.

Air is supplied to the ends of the float channel through passageways 80 and 81 and valves are provided in each passageway.

Thus operating a selected valve the float 75 may be pushed to one end or the other of the float channel where it is stopped by contact with either of pins 126 and 127.

The members operating the valve closure may be manually or automatically operated but preferably arrangements are made for each method of operating the valve.

Thus in one method an arrangement as shown in FIG. 3 may be provided wherein the valve body indicated at 73 has a main air supply line 90 fed from a main air supply valve 91.

The main air comes in through inlet line 92 to the main air supply valve which when operated supplies air to inlet 70 and also primes the remaining valves by priming a single down valve 93 through line 94. The single down valve primes an auto down valve 95 through line 96. The auto down valve 95 primes an auto up valve 97 through line 98 and the auto up valve 97 primes a single or emergency up valve 99 through line 100. When auto up valve 97 is operated then a top control valve 101 is primed through line 102.

The valves may comprise mechanical valves. When the single down valve is operated air is supplied to the end 78 of the body 73 through port 80 and line 105 thus pushing the float 75 to the end 79 and allowing air to pass through port 72 and line 122 to the top end of the cylinders 2 and 60, and at the same time allow exhaust air to pass through line 107 to port 71 and exhaust port 120.

The piston is then moved downwardly in the cylinder 2.

By then operating the single or emergency up valve 99 the air is supplied through line 106 to the lower end 79 of the body 73 moving the float 75 to the end 78 of the body and retracting the piston in the cylinders 2 and 60 as air is supplied to the bottom end of those cylinders through line 107. Air is also exhausted from the top end of cylinders 2 and 60 through line 122, port 72 and exhaust port 121. If the auto up valve 97 is operated top control valve 101 is primed and at the desired end of the stroke of pistons 10 and 61 the top valve 101 is operated. This valve 101 may comprise a poppet valve 108 (FIG. 1) which is operated by a lever 109 which is moved downwardly for example by engagement of a nut 110 the position of which may be varied by providing a screw thread therein such that the nut 110 may be adjusted as to position by rotating on the thread 23.

When the top control valve 108 is depressed a ball 111 is operated against spring action 112 thus passing air from inlet 113 to outlet 114.

Operation of the top control passes air to the bottom end 79 of the float chamber thus causing ultimately the piston in cylinders 2 and 60 to be retracted.

If the auto down valve 95 is operated air is supplied to the top end 78 of the float chamber through line 127 and ultimately the pistons in the cylinders 2 and 60 are moved downwardly.

When the stroke has finished and the pistons in cylinders 2 and 60 returned either by operation of the top control valve or by operation of the single up valve.

The valve 95 when operated primes a poppet valve (not shown) situated in the upper end 78 of the valve body or in line 127 and when collar 26 strikes the poppet air is allowed to pass the poppet to enter upper end 78 of the float chamber. Thus when the auto down valve 95 has been operated the collar 26 will operate the poppet valve at each up stroke so that the action continues.

Alternatively the automatic operation can be continued by providing a continuous air supply to each end of the float chamber such that mechanical opening of the valve at one end will cause the valve to be opened briefly to cause the valve to move to the other end of the cylinder whereupon the drill shaft will move in the opposite direction to continue operation.

If air supply is not continued at one end of the valve only operation of the device will occur.

The invention may also be used in a drill having a drill shaft which is mounted on a support shaft. The drill shaft may have a support member and a platform mounted thereon in a manner such that the drill shaft may rotate in the platform but so that longitudinal movement of the platform relative to the drill shaft is prevented. The platform carries a motor to drive the drill shaft, for example, an electric motor, and may also carry control means such as a switch thereon. The drive between the motor and the drill shaft may be by means of pulleys or cogs mounted on the drill shaft and the motor drive shaft and a belt or chain between the pulleys or cogs, and, for example, a plurality of different sized pulleys or cogs may be provided such that a range of speeds may be provided.

The platform may also have a further aperture therein so that it may be fitted in a manner such that the support shaft passes through the platform so as to provide further rigidity for the construction. A suitable bush, such as a brass bush is provided in the aperture.

Thus the motor rises and falls with the operation of the drill shaft which is advantageous as the drive mechanism is thus simplified.

The use of the invention in the preferred form is as follows.

The operating means is used as follows.

It will be assumed that the operating means is being used on a drill and that the chuck of the drill is initially in the withdrawn position. Air is then applied to the upper end of the air cylinder which forces the air piston downwardly drawing the rod with it. The nut on the upper threaded part of the rod after a predetermined fall of the rod will then engage the upper end of the tube causing the tube to move downwardly. When the tube is engaged and begins moving movement of the rod will be checked by the hydraulic fluid contained beneath the hydraulic piston. As the hydraulic piston moves downwardly, the hydraulic fluid is forced through a pipe to the upper end of the hydraulic cylinder and the flow rate in the pipe may be controlled by varying the orifice therein.

When it is desired to retract the drill, air is supplied to the lower end of the air cylinder causing the rod to move upwardly such that a nut on the lower threaded part of the rod engages the bottom of the tube causing the tube and consequently the hydraulic piston to move upwardly forcing hydraulic fluid to move from the upper end of the hydraulic cylinder through the pipe to the lower end thereof. It is an advantage of the invention that the rate of checking may be controlled by controlling the flow rates in the pipes connecting the ends of the hydraulic cylinder.

The valve which it is also assumed is being used on the drill is operated by supplying air to the main air inlet where it becomes available to one of the outlets, being the outlet not closed by the float. If it is desired to supply air to the other outlet, the control means is operated so that a supply of air is provided to the float to move the float to its other position thus making air available to the other outlet. If it is desired to work the device automatically, air is supplied to each end continuously of the valve but is prevented from reaching the float channels by means of a valve. Thus the valve may be opened by being struck by an object such as a detent on the drill shaft or the like to reverse the position of the float, thus causing the drill shaft to move in the other direction.

For a one shot operation, air is not supplied continuously, for example, to the upper end of the body and when it is desired to close the machine down the air can be removed from the lower end of the body.

The single up and single down valves allow air to be supplied quickly to either end of the float channel and this is particularly advantageous at the lower end where the single up valve may provide an emergency retraction of the drill.

The platform mounted on the drill shaft carries the motor thereon and preferably also the switch controlling the motor and as the drill shaft rises and falls the motor and switch will also rise and fall, thus allowing a drive to be taken directly from the motor shaft by means of pulleys and belts.

Thus it can be seen that operating means particularly though not solely for use in a drill and also a valve construction and drill construction are provided which allow, for example, a drill to be simply constructed. It is a particular advantage of the drill that variable speeds of the drill may be provided simply and also that a rapid retraction is provided as a safety feature. Also as the hydraulic cylinder is mounted above the air cylinder, the construction is relatively simple and can be produced at a price which is, to say the least, competitive.

I claim:

1. A drill comprising:

a support shaft;

a pneumatic cylinder rigidly affixed to said support shaft;

a control shaft passing through said pneumatic cylinder;

a pneumatic piston mounted within said pneumatic cylinder on said control shaft;

a hydraulic damping cylinder rigidly mounted with respect to said support shaft and positioned such that the longitudinal axes of said pneumatic cylinder and said hydraulic damping cylinder are in substantial alignment;

a hollow member passing through said hydraulic damping cylinder and having said control shaft passing therethrough and extending from the ends thereof;

a hydraulic piston mounted within said hydraulic damping cylinder on said hollow member;

axially adjustable first engagement means between said control shaft member and said hollow member such that movement of the piston in said pneumatic cylinder in the direction away from said hydraulic damping cylinder causes said control shaft to move a distance predetermined by the position of said first engagement means on said control shaft before said first engagement means engages that end of said hollow member which is further from said pneumatic cylinder to thereby cause said hollow member to move said piston in said hydraulic damping cylinder;

second axially adjustable engagement means positioned on said control shaft between said hollow member and said pneumatic cylinder such that movement of the piston in said pneumatic cylinder in the direction toward said hydraulic damping cylinder causes said control shaft to move through a distance predetermined by the position of said second engagement means on said control shaft before said second engagement means engages that end of said hollow member which is nearer said pneumatic cylinder to thereby cause said hollow member to move said piston in said hydraulic damping cylinder;

a support member rigidly affixed to said control shaft externally of said pneumatic cylinder and said hydraulic damping cylinder, said support member being slidably movable on said support shaft;

a drill shaft rotatably mounted on said support member and having a drill chuck mounted thereon, said drill shaft being mounted on said support member in a manner such that relative movement between said drill chuck and said support member in a direction substantially parallel to the longitudinal axis of said drill shaft is substantially prevented;

a motor carried by said support member so that for each change of position of said drill chuck there is a corresponding change in position of said motor; and drive train provided between said motor and said drill shaft.

2. A drill as claimed in claim 1, wherein said support member is mounted on said support shaft such that said support shaft passes through said support member.

3. A drill as claimed in claim 1 wherein said drive train includes one or more pulleys on said drive shaft, one or more pulleys on said drill shaft, and a belt between said pulleys.

4. A drill as claimed in claim 3 wherein said pulleys are of different diameters such that by moving said belt between different pulleys, different drive speeds may be obtained.

5. A drill as claimed in claim 2 wherein said support member also carries control means for said motor.

6. A drill as claimed in claim 5 wherein said control means includes a switch adapted to be operable to turn on or off said motor.

7. A drill as claimed in claim 1 wherein said hydraulic damping cylinder is positioned vertically above said pneumatic cylinder.

8. A drill as claimed in claim 1 wherein said engagement means include a thread on said rod, and a nut provided on said thread, said nut being of sufficient diameter to engage the ends of said hollow member.

9. Operating means as claimed in claim 1 wherein two pipes are provided connecting each end of said hydraulic cylinder such that hydraulic fluid removed from one end of said hydraulic cylinder by said hydraulic piston is moved through one of said pipes to the other end of said hydraulic cylinder.

10. A drill as claimed in claim 9 wherein the flow rates in said pipes are controllable.

* * * * *